No. 786,638. PATENTED APR. 4, 1905.
R. J. FLINN.
WATER LEVEL CONTROLLER.
APPLICATION FILED JULY 12, 1904.
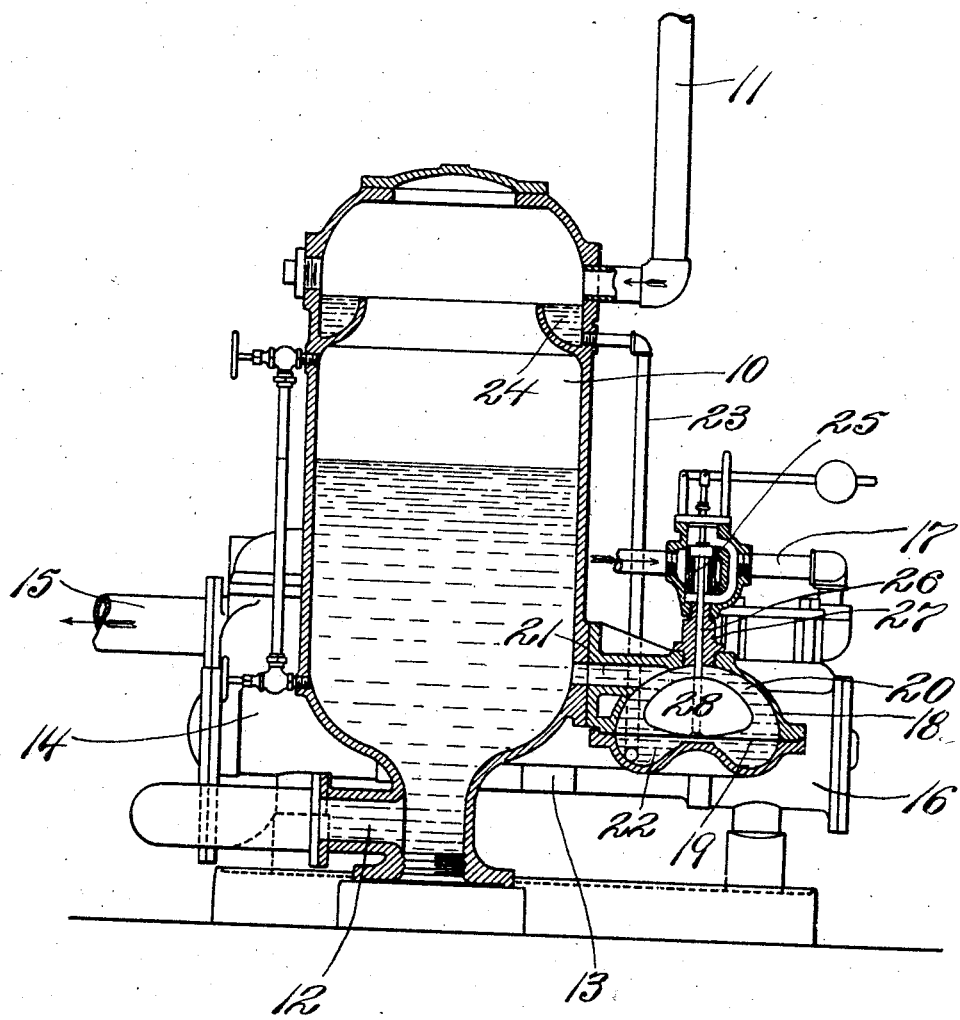
Witnesses:
H. L. Robbins
A. C. Ratigan
Inventor:
R. J. Flinn.
by Wright Brown Quinby
Attorneys.

No. 786,638. Patented April 4, 1905.

UNITED STATES PATENT OFFICE.

RICHARD J. FLINN, OF BOSTON, MASSACHUSETTS.

WATER-LEVEL CONTROLLER.

SPECIFICATION forming part of Letters Patent No. 786,638, dated April 4, 1905.

Application filed July 12, 1904. Serial No. 216,226.

*To all whom it may concern:*

Be it known that I, RICHARD J. FLINN, of Boston, in the county of Suffolk and State of Massachusetts, have invented certain new and useful Improvements in Water-Level Controllers, of which the following is a specification.

This invention relates to means for automatically controlling the level of water in a vessel such as the receiver of a condensation system; and the object of the invention is to provide an improved construction for employment in situations where the pressure of the steam is not relied on to effect either the operation of the controller or the discharge or variation of level in the water. This discharge or level variation is effected by means of a valve external to the casing of the controller and operated by a certain novel construction, as more fully hereinafter described.

The accompanying drawing represents a sectional view of a pump receiver or controller constructed according to my invention.

Referring to the drawing, 10 is a receiving vessel for the accumulation of water, such as water of condensation which is received through an inlet-pipe 11 and discharged through an outlet 12, with which I have shown connected a steam-pump 13, 14 being the pump-cylinder thereof, having discharge-pipe 15, and 16 the steam-cylinder, having supply-pipe 17.

18 represents the casing of the controller, across which is placed a flexible diaphragm 19, having a water-chamber 20 above it connected with the interior of vessel 10 by a duct 21 below the maximum water-line level in said vessel and below it a second water-chamber 22, connected by a pipe 23 with a trough 24 in the upper part of vessel 10, said trough receiving a portion of the drainage from pipe 11, and thereby maintaining a constant head of water, which presses upwardly on the diaphragm 19.

25 is a throttle-valve in the steam-conduit 17, which opens by the downward movement of a valve-stem 26, passing through a long bearing 27 in the wall of the upper diaphragm-chamber 20 and connected at its lower end with the diaphragm 19. A weight 28 within the upper diaphragm-chamber operates to assist the depression of the diaphragm and the opening movement of the valve. A spring may be substituted for this weight.

When the water in vessel 10 is at a relatively low level, the head of water in pipe 23 furnishes an upward pressure on the diaphragm 19, which overbalances the downward pressure on the diaphragm and closes the valve 25. When the water has risen to a predetermined maximum level in chamber 10, its downward pressure overcomes the upward pressure on the diaphragm and opens the valve, thereby starting the pump 13 and causing the excess of water to be exhausted from the vessel 10.

The invention is not confined to the employment of a pump for depressing the level of water in the receiver or other vessel with which the controller is connected, as in some situations—as, for instance, when the controller is employed as a vacuum-breaker—the valve 25 may control the admission of air to the pipe or chamber in which the water accumulates or rises.

I claim—

In a water-level controller, the combination of a vessel for the accumulation of water, having an inlet, a controller-casing having a flexible diaphragm below the maximum water-line in said vessel, a chamber on one side of the diaphragm having a duct connecting it with the interior of said vessel below said water-line, a second chamber on the other side of the diaphragm, a conduit leading to said second chamber and having connections with the inlet to said vessel for maintaining a constant valve-actuating head of water on the diaphragm, means for yieldingly depressing the diaphragm against said head, a valve external to the casing and actuated by the pressure of said constant head, means arranged to be set in operation by the actuation of said valve to cause a depression of the water-level in said vessel, and a valve-operating stem actuated by said diaphragm and traversing one of said chambers and the outer wall thereof.

In testimony whereof I have affixed my signature in presence of two witnesses.

RICHARD J. FLINN.

Witnesses:
R. M. PIERSON,
L. E. KENNEDY.